Figure 1:
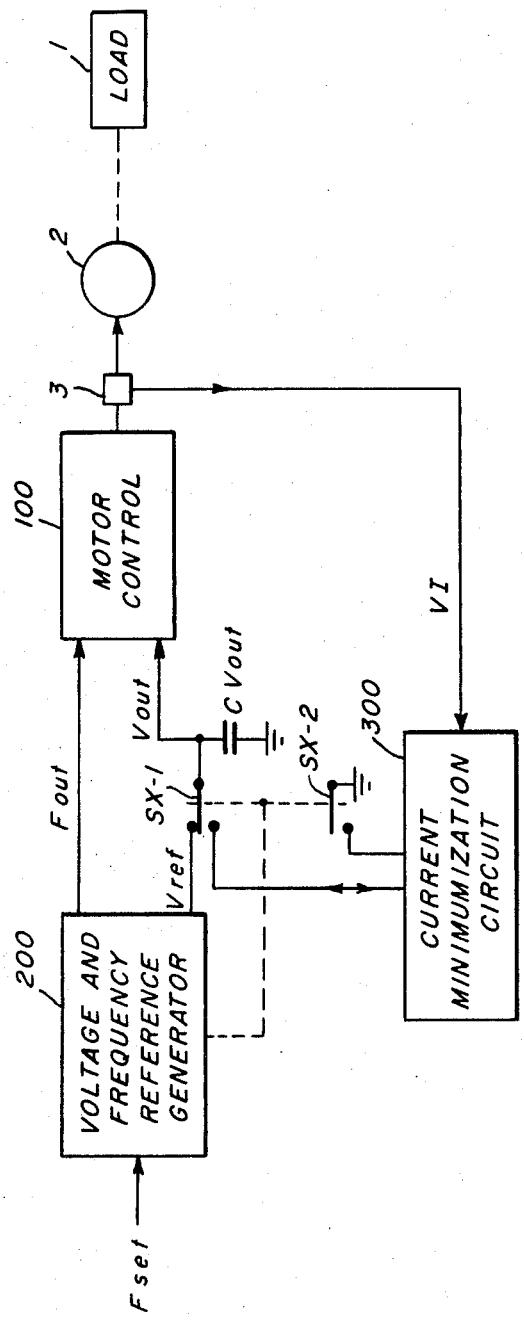

United States Patent [19]

Opal et al.

[11] 3,723,840
[45] Mar. 27, 1973

[54] APPARATUS FOR MOTOR CURRENT MINIMIZATION

[75] Inventors: Kenneth E. Opal, Oakmont; Charles R. Kelly, Murrysville; Charles W. Newcamp, Lower Burrell, all of Pa.

[73] Assignee: Power Control Corporation, Pittsburgh, Pa.

[22] Filed: Jan. 21, 1972

[21] Appl. No.: 219,703

[52] U.S. Cl. ................................................. 318/432
[51] Int. Cl. ................................................. H02p 5/28
[58] Field of Search ............... 318/230, 432, 433, 434

[56] References Cited

UNITED STATES PATENTS

| 3,624,837 | 11/1971 | Albarda | 318/434 X |
| 3,611,089 | 10/1971 | Mokrytzki et al. | 318/230 X |
| 3,577,176 | 5/1971 | Kreithen et al. | 318/432 |

*Primary Examiner*—Bernard A. Gilheany
*Assistant Examiner*—W. E. Duncanson, Jr.
*Attorney*—Brown, Murray, Flick & Peckham

[57] ABSTRACT

Current minimization in a motor control system is obtained through a voltage control where the amplitude of the applied voltage is increased or decreased each time measured motor current passes through a detected minimum current level.

8 Claims, 7 Drawing Figures

Patented March 27, 1973

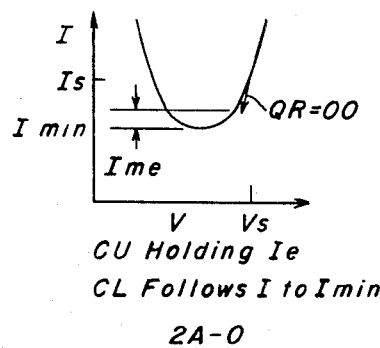

2A-0
CU Holding Ie
CL Follows I to Imin

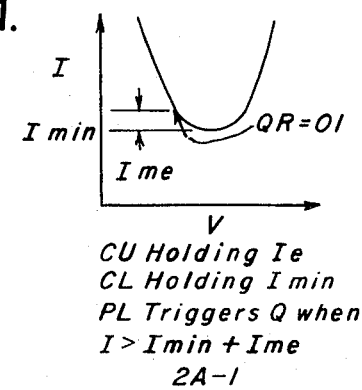

2A-1
CU Holding Ie
CL Holding Imin
PL Triggers Q when
I > Imin + Ime

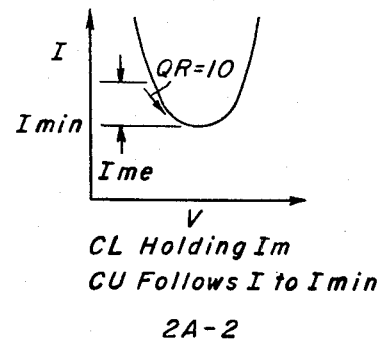

2A-2
CL Holding Im
CU Follows I to Imin

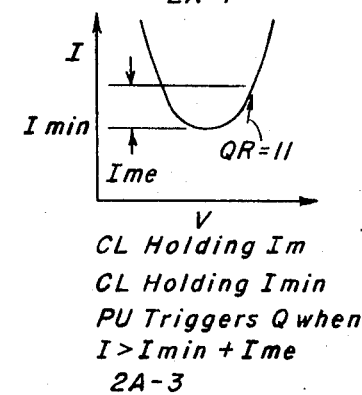

2A-3
CL Holding Im
CL Holding Imin
PU Triggers Q when
I > Imin + Ime

FIG. 2B.

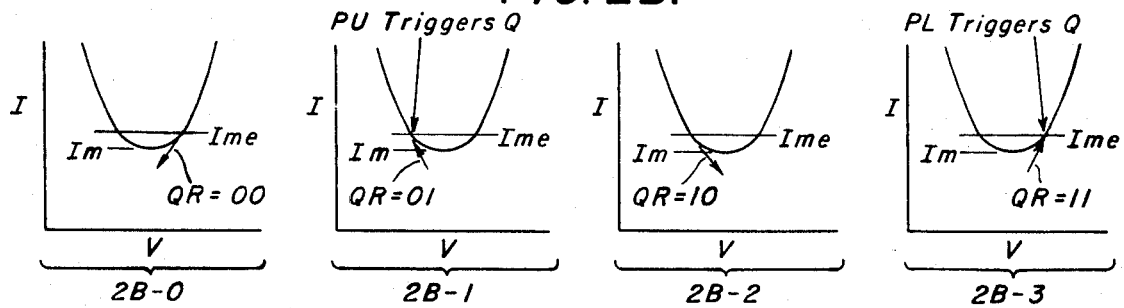

FIG. 2C.

| | MODE CODE MQR | Q | STEADY STATE CURRENT MINIMUMIZATION | |
|---|---|---|---|---|
| 2C-0 | M00 | 0 | I Decreases | CU Holds Minimum I (Im) CL Follows I to Minimum |
| 2C-1 | M01 | V Decreases 0 to 1 on PL Pulse | I Increases | PL Triggers Q when I > CL (Im) |
| 2C-2 | M10 | 1 | I Decreases | CU Follows I to Minimum CL Holds Minimum |
| 2C-3 | M11 | V Increases 1 to 0 on PU Pulse | I Increases | PU Triggers Q when I > CU |

To M00

APPARATUS FOR MOTOR CURRENT MINIMIZATION

CROSS-REFERENCES TO RELATED APPLICATIONS (1) Application Ser. No. 219,704, filed Jan. 21, 1972 and entitled "Method and Apparatus for Providing Efficient and Stable Power Inversion with Voltage and Frequency Control".

BACKGROUND OF THE INVENTION

In motor control systems of the type described in copending application constituting Reference (1) above, provision is made to determine the minimum current required to maintain constant torque for a given load condition and, as the motor or load changes, the system continuously seeks the new current minimum and regulates about this level. It has been found that as the voltage is varied under constant load conditions, motor current decreases as the voltage is increased from a relatively low level and reaches a minimum value with further increases in voltage thereafter causing the current to increase. In low load operating conditions, it has been found that motor current may be decreased as much as 40 percent while still maintaining constant torque. Even under heavy load conditions, the current reduction may still be as high as 15 percent.

SUMMARY OF THE INVENTION

The invention provides a method and apparatus for automatically finding the optimum motor operating point where current is held to within 200 milliamperes of its minimum value while still maintaining constant torque. The result is a considerable reduction in motor losses and improved efficiency in the control system which may be of the type described in the above-identified copending application.

According to the basic method of the invention, first and second directional sample and hold circuits are utilized to detect minimum current conditions during periods of increasing and decreasing applied voltage. The output signals provided by the sample and hold circuits are compared in respective differential amplifiers with a signal representing motor current. Whenever the current crosses the level of the sampled current minimum in an increasing direction, a trigger pulse is generated which causes the voltage applied to the motor to change accordingly. Thus, if during increasing voltage, current decreases to a minimum with a sample being held in the first sample and hold circuit, then after the current rises above this minimum, the voltage is decreased, with the sampling function being transferred to the second sample and hold circuit.

Since the invention may be employed in a system where the initial direction of voltage movement (increasing or decreasing) is not known, provision is made, according to the invention, to establish an upper current limit referred to herein as I$e$. The method of control then provides that whenever the current is caused to exceed an initial current condition (I$s$), which is less than I$e$, the direction of voltage movement is reversed. Thus, during the initial operation of the invention, the current level I$s$ is utilized to trigger the voltage state whereas, once the minimum current has been detected, a current level I$m$, representing minimum current, is thereafter utilized.

Figure 2:
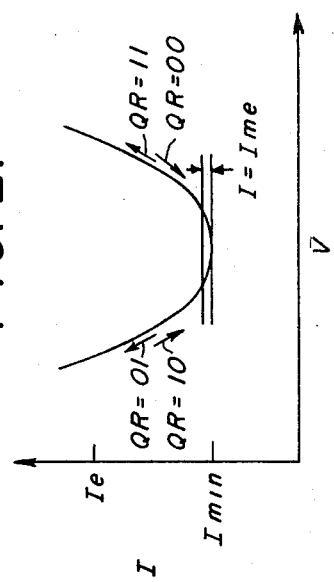
Figures 3, 4:
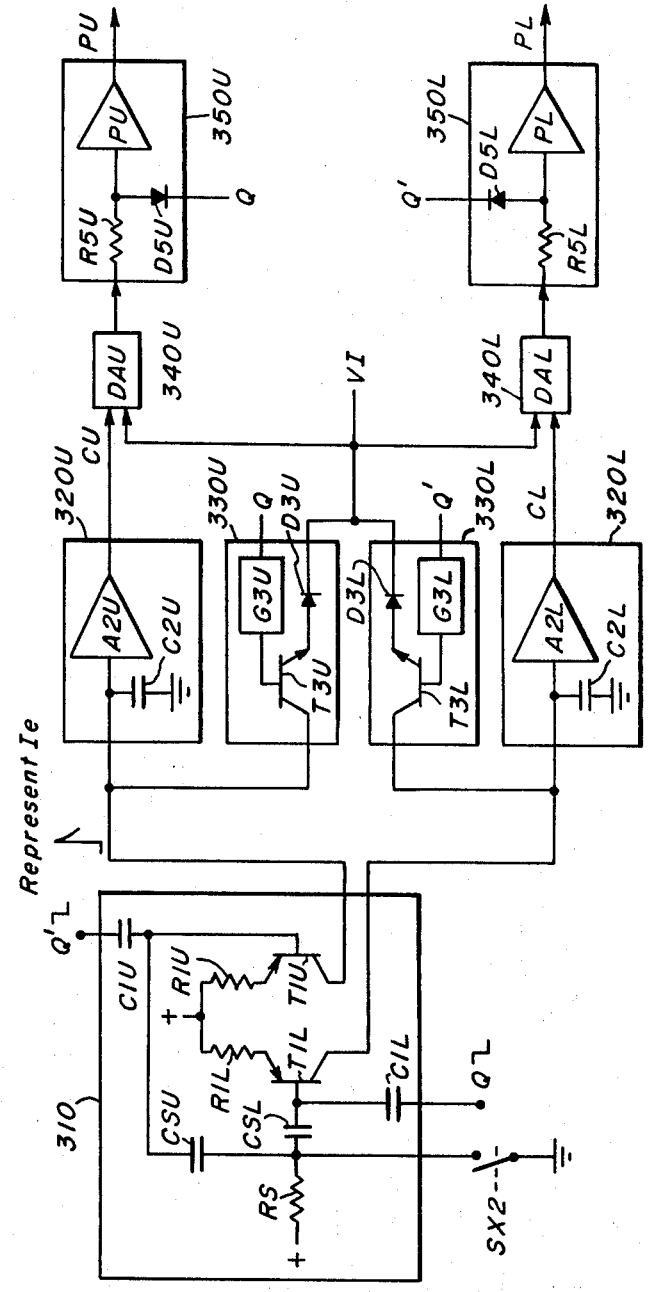

The above and other objects and features of the invention will become apparent from the following detailed description taken in connection with the accompanying drawings which form a part of this specification, and in which:

FIG. 1 shows a system employing the invention;
FIG. 2 shows a curve relating voltage to current for a typical motor;
FIG. 2A shows a set of curves illustrating the method of operation of the invention under initial error conditions;
FIG. 2B shows a set of curves illustrating a method of operating according to the invention to maintain a stable minimum current condition;
FIG. 2C is a chart summarizing the modes of control during steady-state current minimization;
FIG. 3 is a block diagram of apparatus for carrying out the current minimization method of the invention; and
FIG. 4 is a schematic diagram showing specific circuits which are suitable for providing the function of the means shown in FIG. 3.

In FIG. 1, a load 1 driven by a motor 2 is controlled through a motor control 100 in response to output voltage (V$out$) and frequency (F$out$) reference signals which are initially provided by a voltage and frequency reference generator 200. A detailed description of the specific structure suitable for means 100 and 200 is found in Reference (1) above. The current of motor 2 is sensed through a suitable transducer 3 producing representation VI having a level corresponding to the sensed current. As is more fully explained in Reference (1), the motor is started up under control of means 200 in response to a frequency set signal (F$set$). At this time, a switch SX with contacts SX1 and SX2, is in its normally closed state so that the voltage reference signal Vref is applied through contact SX1 to a capacitor CVout producing reference signal Vout applied to motor control 100. When Fout reaches Fset, switch SX is actuated to transfer voltage control to the current minimization circuit 300 of the invention. At this time, SX2 also closes providing a negative pulse for an error signal generator within means 300 to establish an upper current level reference. This upper level is referred to herein as I$e$.

Before considering the specific apparatus utilized to practice the method of the invention, the basic method will be described with reference to FIG. 2. It will be noted that four possible operating conditions are set forth as related to the voltage-current curve for the motor. Since the control logic utilized in carrying out the method of the invention is based upon the logical definition of the operating conditions, they have been translated into an operating code referred to as QR. The representation Q is ON, or in a 1 state, when voltage is increasing and is OFF or in the 0 state when voltage is decreasing. The representation R corresponds to the increasing and decreasing directions of current so that when current is increasing, $R = 1$, and when current is decreasing, $R = 0$. Thus, it will be noted that two operating conditions exist to the left of the minimum current level I$m$ referenced as QR = 01, when current increases for decreasing voltage, and operating condition QR = 10, when current decreases for increasing voltage. To the right of the minimum current level I$m$, the two operating conditions are: $QR = 11$ when both current and voltage increase; and $QR = 00$ when both voltage and current decrease.

Reference is now made to FIG. 2A to illustrate the basic method of control starting from an initial condition where the initial current level is represented as I$s$ and the initial voltage level is represented as V$s$. This initial state is assumed to be to the right of the current minimization point. The system is assumed to start operation in mode $QR = 00$ and voltage is decreased. During this time, a first directional sample and hold circuit (referred to sometimes as upper circuit CU) holds a value corresponding to I$e$, and a second sampling circuit (referred to sometimes as CL) follows the sensed current, represented by signal VI, to the minimum level I$m$. As the voltage then decreases further, current increases during mode $QR = 01$ (FIG. 2A-1) until the detected current exceeds the minimum level (I$m$) sampled by circuit CL. When this happens, a circuit referred to as PL, triggers reference Q in order to reverse the direction of voltage variation. Thus, mode $QR = 10$ follows (FIG. 2A-2) with increasing voltage and decreasing current, during which time circuit CU follows the measured current down to level I$m$ while CL holds the previously detected minimum value I$m$. The final mode occurs when the minimum point is passed and both voltage and current increase. This is terminated when the current exceeds the minimum level I$m$ by a maximum error referenced as I$me$. This triggers an upper pulse circuit referenced as PU, which causes Q to reverse again and the system then re-enters mode QR = 00.

The operation of the system, following the establishment of the minimum current level I$m$, may be considered to be a steady state series of modes and is summarized in the curves of FIG. 2B. During mode $QR = 00$ (M00), both voltage and current decrease with the function of the upper and lower circuits being summarized in FIG. 2C-0. Specifically, the upper circuit holds the last minimum current sample I$m$ which was detected during the increasing voltage period (Q = 1) which preceded mode M00. It may be considered that this was the sample and hold function of circuit CU during modes M10 and M11 shown in FIGS. 2A-2 and 2A-3.

After mode M00, mode M01 is entered, characterized by a reversal in the trend of the current which begins to increase. This mode is terminated when the measured current exceeds I$m$ and circuit PL is triggered reversing both Q and R to cause entry into mode M10. During this mode, voltage increases and current decreases with circuit CU following current to the minimum and circuit CL holding the previous minimum. Mode M11 is then entered when current starts to increase again being terminated when the current level exceeds the minimum held by circuit CU causing a pulse circuit PU to trigger Q and to re-enter mode M00 previously discussed.

Thus far, only one of the four possible starting states have been considered where current was at an initial level I$s$ for a voltage V$s$ and the initial mode was assumed to be $QR = 00$. The following provides a summary of the other three possible starting states:

SUMMARY OF OTHER STARTING STATES

QR = 01    PL triggers Q when I> I$s$
QR = 10    CU follows to I$m$; CL holds I$s$
QR = 11    PU triggers when I> I$m$
QR = 00    CU holds I$m$; CL follows to I$m$
QR = 01    PL triggers Q when I> I$m$
QR = 10    CU follows to I$m$; CL holds I$e$
QR = 11 PU triggers Q
  when I> I$m$
QR = 00    CU holds I$m$; CL follows to I$m$
QR = 01    PL triggers Q when I> I$m$
QR = 11    PU triggers Q when I> I$s$
QR = 00    CU holds I$s$; CL follows to I$m$
QR = 01    PL triggers Q when I> I$m$
QR = 10    CU follows to I$m$; CL holds I$m$
QR = 11    PU triggers Q when I> I$m$ It will be noted that in all cases of increasing voltage ($Q = 1$), the upper circuit CU follows the current to the minimum value and the lower circuit CL holds the previous sample which may not be at the minimum during the initial starting condition. In the case where voltage is decreasing ($Q = 0$), it is circuit CL that follows the current to the minimum I$m$ and circuit CU during that time holds the previous sample. In all cases, after the initial modes, the system becomes stabilized about the steady-state current minimization modes M00-M11 summarized in FIG. 2C.

The general organization of apparatus for carrying out the method of the invention is set forth in FIG. 3 where a sample error pulse generator 310 is initially actuated by switch SX2 to establish the maximum current error level I$e$. A specific circuit for accomplishing this will be considered with reference to FIG. 4. Two directional sample and hold circuits 320U and 320L receive a representation of the current VI through respective gated sampling amplifiers 330U and 330L controlled by signals Q and Q', respectively. Thus, when voltage is increasing, amplifier 330U is turned ON and sample and hold circuit 320U then follows the current representation while amplifier 330L is biased OFF by signal Q' so that sample and hold circuit 320L functions to hold its previous sample. These operating conditions are reversed when the state of signal Q changes from a 1 to 0, in which case the lower sample and hold circuit 320L becomes operative to follow the current representation and the upper sample and hold circuit then holds its previously sampled minimum value. The output signals of circuits 320 are applied to respective differential amplifiers 340U and 340L which also receive the current representation. Amplifiers 340 have their outputs applied to respective gated pulse amplifiers 350U and 350L controlled by signals Q and Q', respectively. When voltage is increasing, it is the upper pulse amplifier 350U that is rendered operative so that as soon as the sensed current level exceeds level I$m$ held in circuit CU, an output pulse PU is generated which then triggers the state of a flip-flop Q (360) switching to the next mode of operation. In a similar manner, when voltage is decreasing, amplifier 350L becomes operative to generate a pulse PL when the sensed current level exceeds I$m$ held by the lower circuit.

The output signals of circuit Q, which may be a flip-flop, are utilized to turn ON either an upper current source 370U (also referenced as CSU) or a lower current source 370L (also referenced as CSL). Thus, when voltage is to be increased and signal Q is ON, source CSU charges up capacitor CVout, and when flip-flop Q is OFF, lower current source CSL is effective to discharge capacitor Vout.

Means 310 of FIG. 3 is provided by an equivalent circuit 310 in FIG. 4 where switch signal SX2 causes a pulse to be generated through a capacitor CSL, forward-biasing the base of a transistor T1L to charge a holding capacitor C2L in lower sampling circuit 320L. A similar initial charge, representing the current error Ie, is passed through a capacitor CSU in circuit 310 to the base of a transistor T1U causing it to be forward-biased and to transmit a charging pulse representing Ie to an upper holding capacitor C2U in circuit 320U. Thus, at the start of operation, the representation of signal Ie is applied to both upper and lower circuits. During the following circuit operation, however, the error representation is sent only to that circuit which is to operate to follow the current representation VI. Thus, when signal Q changes from an ON state to an OFF state, a negative pulse passes through capacitor C1L in circuit 310 to bias ON transistor T1L and, at the same time, gated sampling amplifier 330L is turned ON by Q' as signal Q goes OFF. Within circuit 330L, a gate input G3L receives signal Q' and is operative to forward-bias a transistor T3L so that the current representation VI may be sampled through a diode D3L. In a similar manner, when signal Q first turns ON, its complementary signal Q' turns OFF, sending a negative pulse through capacitor C1U in circuit 310 to forward-bias transistor T1L to send a pulse representing Ie to capacitor C2U and gated sampling amplifier 330U is turned ON by signal Q through a gate input G3U applied to the base of a transistor T3U, the emitter of which receives the current representation VI through a diode D3U.

During periods of increasing voltage (Q = 1), the upper circuit then functions to follow or sample the current representation and to discharge capacitor C2U to the minimum current value. Capacitor C2U cannot go below the minimum value because of the biased direction of amplifier 330U and thus, as current passes the minimum level and rises, capacitor C2U remains at the lowest sampling level. During the time voltage is increasing in this manner, circuit 330L is OFF and capacitor C2L holds whatever level was previously established during its sampling period. In a similar manner, when voltage is decreasing, the lower circuit is operative to follow the current representation whereas the upper circuit holds the previously detected minimum current level.

Upper and lower differential amplifiers 340, referred to as DAU and DAL, operate in the same manner to detect the crossing of the current representation VI over the sampled current level. The sampled level made during initial operation may be higher than the minimum current, but it is eventually brought to the minimum level after several modes, as previously described. The differential amplifiers are operative to produce pulses for crossings in either direction with the control selecting the proper trigger pulse being obtained in gated pulse amplifiers 350. Amplifier 350U receives signal Q so that the upper pulse amplifier becomes operative only when voltage is increasing (Q = 1) and specifically for the state QR = 11 or mode M11.

A suitable arrangement for pulse amplifier 350 is shown where a diode D5 receives the gating signal at its cathode and the anode thereof is connected to a resistor R5 which receives the differential amplifier output signal. The junction of the resistor and the diode is utilized to turn ON a pulse amplifier to produce the desired trigger pulse. When the gating signal, such as Q, is at a low level, the associated diode, in this case D5U, holds the amplifier input to a reference level such as ground, preventing any trigger pulse from being generated.

From the foregoing description, it should now be apparent that the invention provides an effective method for automatically detecting and stabilizing a control signal at that level which will assure substantially minimum motor current. While specific circuits have been shown, it will be understood that the basic concept may be practiced with a large variety of circuits.

The concept of current minimization may be generalized to cover any situation where a control signal may be varied to minimize or maximize the level of an output or load signal. The stabilization point in all cases occurs where the derivative of the signal if substantially zero. Although, theoretically, the method of the invention makes it possible to hold the operating point at precisely zero, in actual practice, a small error between Im and Ime will exist due to the hysteresis characteristic of the differential amplifying means which are employed. It has been found in actual practice, however, that the error in the stabilization is a very small percentage of the total reduction of the output signal, (specifically current).

I claim as my invention:

1. In a motor control system wherein motor current is caused to decrease for increasing applied voltage until a minimum current point is reached and then increases with increasing applied voltage thereafter, the combination comprising: first and second directional sample and hold means for detecting minimum current conditions during periods of increasing and decreasing input voltages; first and second gated pulse means for producing trigger pulses when the current rises above said minimum current point during periods of increasing and decreasing voltages; and voltage level varying means responsive to said trigger pulses for changing the direction of voltage variation each time a trigger pulse is received.

2. In the system of claim 1 wherein there is included means for establishing a predetermined initial voltage in a capacitor and means for producing a switching signal to initiate current minimization, said combination including sample error pulse generating means for entering a predetermined upper current limit signal into said sample and hold means.

3. The combination of claim 2 wherein trigger pulses are produced to reverse voltage direction when the motor current reaches an initial upper current value.

4. The method of varying voltage in a motor control system to minimize motor current comprising: decreasing voltage until motor current crosses either a minimum, or maximum error level while current is increasing; increasing voltage until motor current crosses either a minimum, or maximum error level with current again increasing; and maintaining steady-state current minimization by reversing the direction of voltage variation each time motor current decreases to a minimum and then rises slightly above said minimum by a maximum error value.

5. A method for maintaining steady-state current minimization in a motor control system comprising: establishing four control modes for the conditions of: (0) voltage and current decreasing; (1) voltage decreasing with increasing current; (2) voltage increasing with decreasing current; and (3) voltage and current both increasing; operating a first circuit to hold a signal representing minimum current and a second circuit to follow current to the minimum during mode (0); comparing a signal representing motor current with the signal held by said second circuit during mode (1) and switching to mode (2) when motor current exceeds the minimum current held by said second circuit; operating said first circuit to follow motor current to said minimum and said second circuit to hold the previously sampled minimum current during mode (2) and comparing the signal of said first circuit with said motor current representation to switch to mode (0) when motor current exceeds the minimum current representation.

6. In a system wherein an output signal is caused to vary in response to a control signal such that the derivative of the output signal with respect to the control signal changes sign as the control signal crosses a certain level, a method for automatically varying said control signal to cause the output signal to assume a minimum level where the derivative of said output signal is substantially zero, said method comprising sampling the level of said output signal as its derivative decreases during periods of increasing control signal and holding the zero derivative level of said output signal during periods of decreasing control signal to produce a first sample and hold sample; sampling the level of said output signal as its derivative decreases during periods of decreasing control signal and holding the zero derivative level of said output signal during period of increasing output signal to produce a second sample and hold signal; and changing the direction of control signal variation each time the output signal to level crosses the level of either of said sample and hold signals.

7. The method of claim 6 wherein said output signal is motor current and said control signal is voltage.

8. The method of claim 7 wherein first and second trigger pulses are generated when the current level sampled crosses the level of said first and second sample and hold signals, respectively.

* * * * *